United States Patent [19]
Kamei et al.

[11] Patent Number: 5,604,281
[45] Date of Patent: Feb. 18, 1997

[54] ULTRAVIOLET-AND INFRARED-RAY ABSORBING POLYMER COMPOSITION

[75] Inventors: Teruaki Kamei; Takao Koya; Masaaki Tamura; Emiko Iwata; Syuko Shindo, all of Gunma-ken, Japan

[73] Assignee: The Japan Carlit Co., Ltd., Tokyo, Japan

[21] Appl. No.: 433,202

[22] Filed: May 2, 1995

[30] Foreign Application Priority Data

May 9, 1994 [JP] Japan .................................. 6-117367
Apr. 21, 1995 [JP] Japan .................................. 7-118989

[51] Int. Cl.$^6$ .................. C08K 5/16; C08K 5/3477; C08K 5/132; C08K 5/3467
[52] U.S. Cl. .................. 524/204; 524/91; 524/291; 524/336; 524/337
[58] Field of Search ................... 524/91, 204, 291, 524/336, 337

[56] References Cited

U.S. PATENT DOCUMENTS

| | | | |
|---|---|---|---|
| 3,484,467 | 12/1969 | Susi et al. | 524/204 |
| 3,485,650 | 12/1969 | Milionis et al. | 524/204 |
| 3,557,012 | 1/1971 | Tucker | 524/204 |
| 3,575,871 | 4/1971 | Susi et al. | 524/204 |
| 3,709,830 | 1/1973 | Susi | 524/204 |
| 4,933,110 | 6/1990 | Tucker | 252/582 |
| 5,210,122 | 5/1993 | Fontana et al. | 524/204 |
| 5,326,799 | 7/1994 | Fontana et al. | 524/91 |
| B1 3,575,871 | 4/1986 | Susi et al. | 524/204 |

FOREIGN PATENT DOCUMENTS

| | | |
|---|---|---|
| 44911 | 2/1982 | European Pat. Off. . |
| 0044911 | 2/1982 | European Pat. Off. . |
| 375898 | 7/1990 | European Pat. Off. . |
| 510958 | 10/1992 | European Pat. Off. . |
| 57-45509 | 3/1982 | Japan . |
| 4-285655 | 10/1992 | Japan . |
| 5-117504 | 5/1993 | Japan . |
| 5-295967 | 11/1993 | Japan . |

OTHER PUBLICATIONS

Patent Abstract of Japan, vol. 018, No. 090 (m–1560), Feb. 15, 1994 and JP–A–05 295967 (The Japan Carlit Co., Ltd, Nov. 9, 1993.

*Primary Examiner*—Peter A. Szekely
*Attorney, Agent, or Firm*—Sughrue, Mion, Zinn, Macpeak & Seas

[57] ABSTRACT

The ultraviolet- and infrared-ray absorbing polymer composition contains 0.01-1 part by weight of an organic ultraviolet-ray absorbent and 0.001-2 parts by weight of an organic infrared-ray absorbent onto 100 parts by weight of a polycarbonate resin which implies 10–100% by weight of copolyestercarbonate, manufactured by heat-molding process at 210°–245° C. from a mixture of those components. This polymer composition is manufactured easily by an ordinary screw extruder or injection molding machine without strict control of heat-molding temperature, at a high non-defective ratio, said product having a stable effect in absorbing ultraviolet rays and infrared rays, while allowing transmittance of visible radiation rays, thus making it suitable for a wide variety of uses.

4 Claims, No Drawings

ULTRAVIOLET-AND INFRARED-RAY ABSORBING POLYMER COMPOSITION

FIELD OF THE INVENTION

This invention relates to an ultraviolet- and infrared-ray absorbing polymer composition, which is used for windows or screens adjacent to windows of vehicles and buildings and selectively transmits visible light rays and screens out harmful ultraviolet rays and infrared rays. More specifically, it relates to an ultraviolet- and infrared-ray absorbing polymer composition implying a copolyestercarbonate resin.

PRIOR ART

Solar beams reaching the earth contain ultraviolet rays and infrared rays in addition to visible light rays, which often bring about disadvantageous effects. It is also pointed out that ultraviolet rays cause sunburn, accelerate aging of the skin and cause cutaneous cancer in the human body. Besides, they can cause deterioration in materials such as a decrease in strength, the occurrence of cracks and coloring and fading in synthetic resins, synthetic rubbers, synthetic fibers and dyes. Infrared rays cause heat and decrease the efficiency of air-conditioning machines such as air conditioners, which results in high energy expenditure. Moreover, when infrared rays act upon the human body and permeate the skin to be absorbed and have a thermal effect (e.g., solar light being irradiated to the skin), it is difficult to reduce heat sufficiently even by using an air conditioning machine such as an air conditioner. On the other hand, visible light rays are useful for ensuring sufficient brightness in a room; and hence a technique for transmitting visible light rays and simultaneously shutting out ultraviolet rays causing a deterioration in substances and infrared rays becoming a heat source selectively has been required.

So-called blinds have been employed broadly with a view to controlling the light of ultraviolet rays, visible light rays and infrared rays transmitting a glass surface. However, materials which do not allow light to permeate them have been used. Thus it is required to provide a material which will allow light rays to be controlled selectively.

A polymer composition obtained by kneading a polymethacrylacrylate resin or a polycarbonate resin uniformly with an organic ultraviolet-rays absorbent and an organic infrared-rays absorbent is disclosed in Japanese Patent Public Disclosure No. 295967/1993 as a blind having solved the above problems and having a function of shutting out unnecessary ultraviolet rays and infrared rays without impairing the original function of taking in light of window glass.

Although a polycarbonate resin is utilized broadly because of its superior thermal resistivity and shock resistivity, it requires heat-molding at a high temperature beyond about 250° C. to produce the polymer composition of Japanese Patent Public Disclosure No. 295967/1993 and an organic infrared-rays absorbent might deteriorate. Hence, it is necessary to control the temperature of heat-molding strictly, and even if the temperature of heat-molding is controlled strictly, there has been a problem that obtained products have a low non-defective ratio.

SUMMARY OF THE INVENTION

It is an object of the present invention to provide an ultraviolet- and infrared-ray absorbing polymer composition which solves the above problems, namely, that it does not need a molding temperature beyond about 250° C., that it is capable of being produced easily by means of an ordinary screw extruder or injection molding machine at a high non-defective ratio and that it exhibits stable effects in absorbing ultraviolet rays and infrared rays.

Other objects and advantages of the present invention may become apparent to those skilled in the art from the following description and disclosure.

DETAILED DESCRIPTION OF THE PREFERRED EMBODIMENTS

The present invention is the ultraviolet- and infrared-ray absorbing polymer composition composed of an organic ultraviolet-ray absorbent, an organic infrared-ray absorbent and a polycarbonate resin, containing 0.01–1 part by weight of an organic ultraviolet-ray absorbent and 0,001–2 parts by weight of an organic infrared-ray absorbent onto 100 parts by weight of a polycarbonate resin which implies 10–100% per weight of copolyestercarbonate, manufactured by heat-molding process at 210°–245° C. from a mixture of those components.

The polycarbonate resin used in the present invention implies 10–100% per weight of a copolyestercarbonate resin therein. When the content of a copolyestercarbonate resin is 10–100% per weight, the heat-molding temperature is 210°–245° C. Besides, when the content of a copolyestercarbonate resin is 20–100% per weight, the heat-molding temperature is 210°–240° C. If the content of a copolyestercarbonate resin is less than 10% per weight, it is impossible to set the heat-molding temperature at a temperature lower than about 250° C.

In the polycarbonate resin used in the present invention, the heat-molding temperature is lower than 245° C., and hence production can be performed easily by means of an ordinary screw extruder or injection molding machine without needing strict control of the heat-molding temperature and obtained products have a high non-defective ratio.

The copolyestercarbonate resin used in the present invention has structural units represented by the following Formulae 1 and 2, and the amount of the structural unit of Formula 2 is 2–30 mol% based on the total amount of the structural units of Formulae 1 and 2. The copolyestercarbonate resin is excellent in flowability during heat-molding process maintaining the transparency and shock strength of ordinary polycarbonate resins.

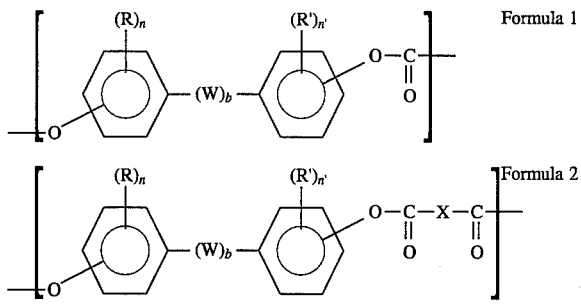

(wherein each of R and R' is independently a halogen atom, a monovalent hydrocarbon group or hydrocarbonoxy group; W is a bivalent hydrocarbon group, $-S-$, $-S-S-$, $-O-$, $-S(=O)-$, $-(O=)S(=O)-$ or $-C(=O)-$; each of n and n' is independently an integer of 0 to 4; X is a bivalent aliphatic group having carbon atoms of 6 to 18; and b is 0 or 1.)

Methods of producing the copolyestercarbonate resin are disclosed in Japanese Patent Public Disclosure No. 285655/1992 (polycarbonate type polymer composition excellent in flame retardant properties even though being formed thin) and Japanese Patent Public Disclosure No. 117504/1993 (polycarbonate type polymer composition with the surface improved and containing an inorganic filler and a polyolefin type resin).

Cyanin type compounds, squarylium type compounds, thiol-nickel complex salts, phthalocyanine type compounds, triarylmethane type compounds, naphthoquinones, anthraquinones, imonium type compounds and aminium type compounds are listed as organic infrared-ray absorbents used in this invention.

Aminium type compounds or imonium type compounds used in this invention as the infrared-ray absorbent exhibit extreme absorption ability in the near-infrared region of wavelength range from 760 to 1500 nm with weak absorption in the visible radiation region. Besides this, such compounds are stable during a molding process as they have poor reactivity with various organic ultraviolet-ray absorbents mixed together, and the infrared-ray absorbing effect of these compounds can be maintained in the long term.

Aminium type compounds such as the infrared-ray absorbents in this invention include the following compounds. For example, N,N,N',N'-tetrakis-(p-dimethyl-aminophenyl)-p-phenylenediaminium chlorate, N,N,N',N'-tetrakis-(p-diethylaminophenyl)-p-phenylenediaminium chlorate, N,N,N',N'-tetrakis-(p-di-n-propylaminophenyl)-p-phenylenediaminium chlorate, N,N,N',N'-tetrakis-(p-di-n-butylaminophenyl)-p-phenylenediaminium chlorate, N,N,N',N'-tetrakis-(p-di-n-pentylaminophenyl)-p-phenylenediaminium chlorate, N,N,N',N'-tetrakis-(p-di-n-hexylaminophenyl)-p-phenylenediaminium chlorate, fluoroborate, trifluoromethane sulfonate, perchlorate, nitrate and hexafluoroantimonate and others are listed; among these compounds, N,N,N',N'-tetrakis-(p-di-n-butylaminophenyl)-p-phenylenediaminium chlorate, fluoroborate, trifluoromethane sulfonate, perchlorate, nitrate and hexafluoroantimonate are preferable, and N,N,N',N'-tetrakis-(p-di-n-butylamino-phenyl)-p-phenylenediaminium hexafluoroantimonate is particularly preferable.

Imonium type compounds such as the infrared-ray absorbents in this invention include the following compounds. For example, N,N,N',N'-tetrakis-(p-dimethyl-aminophenyl)-p-benzoquinone-bis(imonium chlorate), N,N,N',N'-tetrakis-(p-diethylaminophenyl)-p-benzoquinone-bis(imonium chlorate), N,N,N',N'-tetrakis-(p-di-n-propyl-aminophenyl)-p-benzoquinone-bis(imonium chlorate), N,N,N',N'-tetrakis-(p-di-n-butylaminophenyl)-p-benzoquinone-bis (imonium chlorate), N,N,N'N'-tetrakis-(p-di-n-pentyl-aminophenyl)-p-benzoquinone-bis (imonium chlorate), N,N,N',N'-tetrakis-(p-di-n-hexylaminophenyl)-p-benzoquinone-bis(imonium chlorate), fluoroborate, trifluoromethane sulfonate, perchlorate, nitrate and hexafluoroantimonate and others are listed; among these, N,N,N'N'-tetrakis-(p-di-n-butylaminophenyl)-p-benzoquinone-bis(imonium chlorate), fluoroborate, trifluoromethane sulfonate, perchlorate, nitrate and hexafluoroantimonate are preferable, and N,N,N',N'-tetrakis-(p-di-n-butylamino-phenyl)-p-benzoquinone-bis(imonium hexafluoroantimonate) is particularly preferable.

The preferable content of the organic infrared-ray absorbent onto 100 parts by weight of polycarbonate resin is between 0.001 to 2 part by weight. A sufficient infrared-ray absorbing effect cannot be obtained by addition of the absorbent below 0.01 parts by weight. On the other hand, addition of the absorbent over 2 parts by weight does not cause the increase of infrared-ray absorbing effect, but it causes an increase in production costs.

The organic ultraviolet-ray absorbents used in this invention must have such properties as a broad absorbing band and a strong absorbing intensity without disturbing visible radiation transmittance; as organic ultraviolet-ray absorbents, one or more compounds are selected from a group of compounds such as benzotriazole type compounds, benzophenone type compounds, salicylic acid type compounds, cyanoacrylate type compounds and so on.

Benzotriazole type compounds for the purpose of this invention include, for example, 2-(2'-hydroxy-5'-methylphenyl)-benzotriazole, 2-(2'-hydroxy-3 ', 5'-di-t-butyl-phenyl)-5-chloro-benzotriazole, 2-(2'-hydroxy-3'-t-butyl-5'-methylphenyl)-5-chloro-benzotriazole, 2-(2'-hydroxy-3', 5'di-t-aminophenyl)-benzotriazole, 2-(2'-hydroxy-3',5'-di-t-butylphenyl)-benzotriazole, 2-(2'-hydroxy-5'-t-butylphenyl)-benzotriazole, 2-(2'-hydroxy-5'-t-octylphenyl)-benzotriazole and so on.

Benzophenone type compounds for the purpose of this invention include, for example, 2,2', 4,4'-tetrahydroxybenzophenon, 2-hydroxy-4-methoxybenzophenone, 2-hydroxy-4-n-octoxybenzophenone, 2-hydroxy-4-n-dodecyloxybenzophenone, 2,2'-dihydroxy-4,4'-dimethoxybenzophenone, 2,2'-dihydroxy-4methoxybenzophenone, 2-hydroxy-4-methoxy-5-sulfobenzophenone and so on.

Salicylic acid type compounds for the purpose of this invention include, for example, phenyl salicylate, p-t-butylphenyl salicylate, p-octylphenyl salicylate and so on.

Cyanoacrylate type compounds for the purpose of this invention include such as 2-ethylhexyl-2-cyano-3,3'-di-phenylacrylate, ethyl-2-cyano-3'-diphenylacrylate and so on.

The preferable content of the organic ultraviolet-ray absorbent onto 100 parts by weight of polycarbonate resin containing copolyester-carbonate resin is between 0.01 to 1 part by weight. A sufficient ultraviolet-ray absorbing effect cannot be obtained by addition of an absorbent below 0.01 part by weight. On the other hand, addition of an absorbent over 1 part by weight does not cause an increase in the ultraviolet-ray absorbing effect, but it causes an increase in production costs.

Pigments, dyes, spreading agents, lubricants, mold releasing agents, plasticizers, antistatic agents, heat resistant agents, flame retardants, antioxidants and others can be added to the ultraviolet- and infrared-ray absorbing polymer composition, unless they do not spoil the properties of the composition.

The ultraviolet- and infrared-ray absorbing polymer composition of this invention is obtained by adding 0.01 to 1 part by weight of an organic ultraviolet-ray absorbent and 0.001 to 2 parts by weight of an organic infrared-ray absorbent based on 100 weight parts of a polycarbonate onto the polycarbonate resin with the content of a copolyestercarbonate resin therein of 10 to 100% by weight, further adding various additives if required, obtaining a resin pellet according to a dry blending method of mixing them by means of an ordinary dry blending machine or dry decentralization machine at room temperature for 10 to 30 minutes, drying the obtained product at a temperature of 110° C. for more than 4 hours, and then heat-molding it at a temperature of 210° to 245° C. by means of an ordinary screw extruder or injection molding machine.

It can also be obtained by adding an organic ultraviolet-ray absorbent and an organic infrared-ray absorbent, and besides various additives if required, onto a colycarbonate resin with the content of a copolyestercarbonate resin therein of 10 to 100% by weight, heat-molding them at a temperature of 210° to 245° C. to obtain a master pellet, and then heat-molding the master pellet and the polycarbonate resin with the content of a copolyestercarbonate resin therein of 10 to 100 parts by weight at a temperature of 210° to 245° C.

The ultraviolet- and infrared-ray absorbing polymer composition of this invention can be produced easily by means of an ordinary screw extruder or injection molding machine without needing a high temperature of beyond about 250° C. in heat-molding, and the obtained product has a high non-defective ratio.

The thus obtained ultraviolet- and infrared-ray absorbing polymer composition possesses a stable absorbing effect on ultraviolet rays and infrared rays.

Hereunder, the present invention will be described more specifically according to Examples, though it is in no way restricted to these Examples.

EXAMPLE 1

One hundred grams of N,N,N',N'-tetrakis-(p-di-n-butylaminophenyl)-p-phenylenediaminium hexafluoroantimonate (hereinafter abbreviated to "organic infrared-ray absorbent A") and 3 g of 2-(2,'-hydroxy-5'-methoxyphenyl)-benzotriazole (hereinafter abbreviated to "organic ultraviolet-ray absorbent A") were mixed with 5 kg of Lexan SP-1210 (trade name; manufactured by GE Plastics Japan Ltd.; hereinafter abbreviated to "copolyestercarbonate resin A") at room temperature at 50 r.p.m. for 20 minutes by means of a cylinder type blender. The composition thereof is shown in Table 1. Then, after being dried at 110° C. for 4 hours, the resin was heat-molded at 230° C. by means of a screw extruder to obtain a sheet with a thickness of 3 mm.

Transmittance (ultraviolet-ray transmittance at a wavelength of 350 nm and infrared-ray transmittance at a wavelength of 1000 nm) of the obtained sheet was measured by means of a spectrophotometer (U-3410 type manufactured by Hitachi, Ltd.). Its appearance was subject to visual observation. All the obtained sheets were uniform and of excellent appearance. The results are shown in Table 6.

The Izod impact value (according to the standard of ASTM D 265) of the obtained sheet was measured. The result is shown in Table 6.

EXAMPLE 2

A sheet with a thickness of 3 mm was obtained in the same manner as in Example 1 except that 100 g of the organic infrared-ray absorbent A were changed to 0.05 g of N,N,N',N'-tetrakis-(p-di-n-butylaminophenyl)-p-benzoquinone-bis(imonium hexafluoroantimonate) (hereinafter abbreviated to "organic infrared-ray absorbent B") and that 3 g of the organic ultraviolet-ray absorbent A were changed to 0.5 g thereof. The composition thereof is shown in Table 1.

The transmittance and the Izod impact value of the obtained sheet were measured and the appearance was observed in the same manner as in Example 1. All the obtained sheets were uniform and of excellent appearance. The results are shown in Table 6.

EXAMPLE 3

N,N,N',N'-tetrakis-(p-di-n-propylaminophenyl)-p-phenylenediaminium trifluoromethane sulfonate (0.5 g) (hereinafter abbreviated to "organic infrared-ray absorbent C") and 5 g of 2,2',4,4'-tetrahydroxybenzophenone (here-inafter abbreviated to "organic ultraviolet-ray absorbent B") were mixed with 5 kg of Lexan SP-1310 (trade name; manufactured by GE Plastics Japan Ltd.; hereinafter abbreviated to "copolyestercarbonate resin B") at room temperature at 50 r.p.m. for 20 minutes by means of a cylinder type blender to obtain a sheet with a thickness of 3 mm in the same manner as in Example 1. The composition thereof is shown in Table 1.

The transmittance and the Izod impact value of the obtained sheet were measured and the appearance was observed in the same manner as in Example 1. All the obtained sheets were uniform and of excellent appearance. The results are shown in Table 6.

EXAMPLE 4

Five grams of N,N,N',N'-tetrakis-(p-di-n-hexyl-aminophenyl)-p-phenylenediaminium fluoroborate (hereinafter abbreviated to "organic infrared-ray absorbent D") and 25 g of p-t-butylphenyl salicylate (hereinafter abbreviated to "organic ultraviolet-ray absorbent C") were mixed with 5 kg of Lexan SP-1110 (trade name; manufactured by GE Plastics Japan Ltd.; hereinafter abbreviated to "copolyestercarbonate resin C") at room temperature at 50 r.p.m. for 20 minutes by means of a cylinder type blender. Then, after being dried at 110° C. for 4 hours, the resin was heat-molded at 235° C. by means of an injection molding machine to obtain a sheet with a thickness of 3 mm. The composition thereof is shown in Table 1.

The transmittance and the Izod impact value of the obtained sheet were measured and the appearance was observed in the same manner as in Example 1. All the obtained sheets were uniform and of excellent appearance. The results are shown in Table 6.

Example 5

Fifty grams of the organic infrared-ray absorbent A and 50 g of 2-(2'-hydroxy-3'-t-butyl-5'-methylphenyl)-5chlorobenzotriazole (hereinafter abbreviated to "organic ultraviolet-ray absorbent D") were mixed with 0.5 kg of the copolyestercarbonate resin A at room temperature at 50 r.p.m. for 30 minutes by means of a cylinder type blender, and then heat-molded at 230° C. by means of a vented extruder to form a master pellet by means of a chopper. Then, the obtained master pellet and 4.5 kg of the copoly-estercarbonate resin A were mixed to obtain a sheet with a thickness of 3 mm in the same manner as in Example 1. The composition thereof is shown in Table 1.

The transmittance and the Izod impact value of the obtained sheet were measured and the appearance was observed in the same manner as in Example 1. All the obtained sheets were uniform and of excellent appearance. The results are shown in Table 6.

EXAMPLE 6

A sheet with a thickness of 3 mm was obtained in the same manner as in Example 1 except that 100 g of the organic infrared-ray absorbent A were changed to 2.5 g of the organic infrared-ray absorbent A and 2.5 g of N,N,N',N'-tetrakis-(p-di-n-butylaminophenyl)-p-phenylene-diaminium fluoroborate (hereinafter abbreviated to "organic infrared-ray absorbent E") and that 3 g of the organic ultraviolet-ray absorbent A were changed to 0.5 g thereof. The composition thereof is shown in Table 2.

The transmittance and the Izod impact value of the obtained sheet were measured and the appearance was observed in the same manner as in Example 1. All the obtained sheets were uniform and of excellent appearance. The results are shown in Table 6.

EXAMPLE 7

A sheet with a thickness of 3 mm was obtained in the same manner as in Example 1 except that 3 g of the organic ultraviolet-ray absorbent A were changed to 2 g of 2-hydroxy-4-n-octoxybenzophenone (hereinafter abbreviated to "organic ultraviolet-ray absorbent E") and 1 g of ethyl-2-cyano-3'-diphenylacrylate (hereinafter abbreviated to "organic ultraviolet-ray absorbent F"). The composition thereof is shown in Table 2.

The transmittance and the Izod impact value of the obtained sheet were measured and the appearance was observed in the same manner as in Example 1. All the obtained sheets were uniform and of excellent appearance. The results are shown in Table 6.

EXAMPLE 8

A sheet with a thickness of 3 mm was obtained in the same manner as in Example 1 except that 100 g of the organic infrared-ray absorbent A were changed to 2 g of the organic infrared-ray absorbent A, 2 g of N,N,N',N'-tetrakis-(p-di-n-butylaminophenyl)-p-phenylenediaminium perchlorate (hereinafter abbreviated to "organic infrared-ray absorbent F") and 1 g of N,N,N',N'-tetrakis-(p-di-n-butylaminophenyl)-p-phenylenediaminium trifluoromethane sulfonate (hereinafter abbreviated to "organic infrared-ray absorbent G") and that 3 g of the organic ultraviolet-ray absorbent A were changed to 1 g of the organic ultraviolet-ray absorbent A, 2 g of the organic ultraviolet-ray absorbent E and 2 g of po-ctylphenyl salicylate (hereinafter abbreviated to "organic ultraviolet-ray absorbent G"). The composition thereof is shown in Table 2.

The transmittance and the Izod impact value of the obtained sheet were measured and the appearance was observed in the same manner as in Example 1. All the obtained sheets were uniform and of excellent appearance. The results are shown in Table 6.

EXAMPLE 9

Four kilograms of the copolyestercarbonate resin A and 1 kg of Lexan-141 (trade name; manufactured by GE Plastics Japan Ltd.; hereinafter abbreviated to "polycarbonate resin A") were mixed, and then 5 g of the organic infrared-ray absorbent A and 1.5 g of the organic ultraviolet-ray absorbent A were mixed at room temperature at 50 r.p.m. for 20 minutes by means of a cylinder type blender. Then, after being dried at 110° C. for 4 hours, the resin was heat-molded at 230° C. by means of a screw extruder to obtain a sheet with a thickness of 3 mm. The composition thereof is shown in Table 2.

The transmittance and the Izod impact value of the obtained sheet were measured and the appearance was observed in the same manner as in Example 1. All the obtained sheets were uniform and of excellent appearance. The results are shown in Table 6.

EXAMPLE 10

A sheet with a thickness of 3 mm was obtained in the same manner as in Example 9 except that 1 kg of the copolyestercarbonate resin C and 4 kg of Lexan-121 (trade name; manufactured by GE Plastics Japan Ltd.; hereinafter abbreviated to "polycarbonate resin B") were used instead of 4 kg of the copolyestercarbonate resin A and 1 kg of the polycarbonate resin A and that the temperature of heat-molding was changed from 230° C. to 239° C. The composition thereof is shown in Table 3.

The transmittance and the Izod impact value of the obtained sheet were measured and the appearance was observed in the same manner as in Example 1. All the obtained sheets were uniform and of excellent appearance. The results are shown in Table 6.

EXAMPLE 11

A sheet with a thickness of 3 mm was obtained in the same manner as in Example 9 except that 0.5 kg of Lexan SP-1010 (trade name; manufactured by GE Plastics Japan Ltd.; hereinafter abbreviated to "copolyestercarbonate resin D") and 4.5 kg of the polycarbonate resin A were used instead of 4 kg of the copolyestercarbonate resin A and 1 kg of the polycarbonate resin A and that the temperature of heat-molding was changed from 230° C. to 244° C. The composition thereof is shown in Table 3.

The transmittance and the Izod impact value of the obtained sheet were measured and the appearance was observed in the same manner as in Example 1. All the obtained sheets were uniform and of excellent appearance. The results are shown in Table 6.

COMPARATIVE EXAMPLE 1

A sheet with a thickness of 3 mm was obtained by drying 5 kg of the copolyestercarbonate resin A at 110° C. for 4 hours and heat-molding the resin at 230° C. by means of a screw extruder. The composition thereof is shown in Table 4.

The transmittance and the Izod impact value of the obtained sheet were measured and the appearance was observed in the same manner as in Example 1. The results are shown in Table 7.

The transmittance of this sample at a wavelength of 350 nm was 44.0%, indicating that the ultraviolet-ray absorbing effect of this sample was not sufficient; furthermore the transmittance of this sample at a wavelength of 1000 nm was 91.0%, indicating this sample possessed almost no infrared-ray absorbing effect.

COMPARATIVE EXAMPLE 2

A sheet with a thickness of 3 mm was obtained in the same manner as in Example 1 except that 100 g of the organic infrared-ray absorbent A were changed to 0.03 g thereof and that 3 g of the ultraviolet-ray absorbent A were changed to 0.3 g thereof. The composition thereof is shown in Table 4.

The transmittance and the Izod impact value of the obtained sheet were measured and the appearance was observed in the same manner as in Example 1. The results are shown in Table 7.

The transmittance of this sample at a wavelength of 350 nm was 15.0%, indicating that the ultraviolet-ray absorbing effect of this sample was improved as compared with that of Comparative Example 1 but not sufficient; furthermore the transmittance of this sample at a wavelength of 1000 nm was 91.1%, indicating this sample possessed almost no infrared-ray absorbing effect similarly to Comparative Example 1.

COMPARATIVE EXAMPLE 3

Heat-molding was performed in the same manner as in Example 1 except that 100 g of the organic infrared-ray absorbent A were changed to 0.05 g thereof and that 3 g of the organic ultraviolet-ray absorbent were changed to 100 g thereof; however, the obtained sheet was partially opaque and a uniform film was not obtained. The composition thereof is shown in Table 4.

COMPARATIVE EXAMPLE 4

Heat-molding was performed in the same manner as in Example 1 except that 100 g of the organic infrared-ray absorbent A were changed to 150 g thereof and that 3 g of the organic ultraviolet-ray absorbent were changed to 0.5 g thereof; however, the obtained sheet was partially opaque and a uniform film was not obtained. The composition thereof is shown in Table 4.

COMPARATIVE EXAMPLE 5

A sheet with a thickness of 3 mm was obtained in the same manner as in Example 1 except that 5 kg of the copolyestercarbonate resin A were changed to 5 kg of the polycarbonate resin A. The composition thereof is shown in Table 4.

The transmittance and the Izod impact value of the obtained sheet were measured and the appearance was observed in the same manner as in Example 1. The results are shown in Table 7.

About 40% of the obtained sheets had the infrared-ray absorbing effect equivalent to that of Example 1, and they had a poor appearance with visible streaks.

COMPARATIVE EXAMPLE 6

A sheet with a thickness of 3 mm was obtained in the same manner as in Example 1 except that 5 kg of the copolyestercarbonate resin A were changed to 5 kg of the polycarbonate resin A and that the temperature of heat-molding was changed from 230° C. to 260° C. The composition thereof is shown in Table 4.

The transmittance and the Izod impact value of the obtained sheet were measured and the appearance was observed in the same manner as in Example 1. The results are shown in Table 7.

About 30% of the obtained sheets had the infrared-ray absorbing effect equivalent to that of Example 1, and they had a poor appearance with visible streaks.

COMPARATIVE EXAMPLE 7

A sheet with a thickness of 3 mm was obtained in the same manner as in Example 9 except that 4 kg of the copolyestercarbonate resin A were changed to 0.3 kg thereof and that 1 kg of the polycarbonate resin was changed to 4.7 kg thereof. The composition thereof is shown in Table 5.

The transmittance and the Izod impact value of the obtained sheet were measured and the appearance was observed in the same manner as in Example 1. The results are shown in Table 7.

About 80% of the obtained sheets had the infrared-ray absorbing effect equivalent to that of Example 9, and they had a poor appearance with visible streaks.

COMPARATIVE EXAMPLE 8

A sheet with a thickness of 3 mm was obtained in the same manner as in Example 5 except that the polycarbonate resin A was used instead of the copolyestercarbonate resin A. The composition thereof is shown in Table 5.

The transmittance and the Izod impact value of the obtained sheet were measured and the appearance was observed in the same manner as in Example 1. The results are shown in Table 7.

About 20% of the obtained sheets had the infrared-ray absorbing effect equivalent to that of Example 5, and they had a poor appearance with visible streaks.

TABLE 1

| Example | Resin Composition | Parts by weight |
|---|---|---|
| 1 | Copolyestercarbonate resin A | 100 |
|   | Organic infrared-ray absorbent A | 2 |
|   | Organic ultraviolet-ray absorbent A | 0.06 |
| 2 | Copolyestercarbonate resin A | 100 |
|   | Organic infrared-ray absorbent B | 0.001 |
|   | Organic ultraviolet-ray absorbent A | 0.01 |
| 3 | Copolyestercarbonate resin B | 100 |
|   | Organic infrared ray-absorbent C | 0.01 |
|   | Organic ultraviolet-ray absorbent B | 0.1 |
| 4 | Copolyestercarbonate resin C | 100 |
|   | Organic infrared-ray absorbent D | 0.1 |
|   | Organic ultraviolet-ray absorbent C | 0.5 |
| 5 | (1) Copolyestercarbonate resin A | 10 |
|   | Organic infrared-ray absorbent A | 1 |
|   | Organic ultraviolet-ray absorbent D | 1 |
|   | (2) Copolyestercarbonate resin A | 90 |

TABLE 2

| Example | Resin Composition | Parts by weight |
|---|---|---|
| 6 | Copolyestercarbonate resin A | 100 |
|   | Organic infrared-ray absorbent A | 0.05 |
|   | Organic infrared-ray absorbent E | 0.05 |
|   | Organic ultraviolet-ray absorbent A | 0.01 |
| 7 | Copolyestercarbonate resin A | 100 |
|   | Organic infrared-ray absorbent A | 2 |
|   | Organic ultraviolet-ray absorbent E | 0.04 |
|   | Organic ultraviolet-ray absorbent F | 0.02 |
| 8 | Copolyestercarbonate resin A | 100 |
|   | Ogrganic infrared-ray absorbent A | 0.04 |
|   | Organic infrared-ray absorbent F | 0.04 |
|   | Organic infrared-ray absorbent G | 0.02 |
|   | Organic ultraviolet-ray absorbent A | 0.02 |
|   | Organic ultraviolet-ray absorbent E | 0.04 |
|   | Organic ultraviolet-ray absorbent G | 0.04 |
| 9 | Copolyestercarbonate resin A | 80 |
|   | Polycarbonate resin A | 20 |
|   | Organic infrared-ray absorbent A | 0.1 |
|   | Organic ultraviolet-ray absorbent A | 0.03 |

TABLE 3

| Example | Resin Composition | Parts by weight |
|---|---|---|
| 10 | Copolyestercarbonate resin C | 20 |
|   | Polycarbonate resin B | 80 |
|   | Organic infrared-ray absorbent A | 0.1 |
|   | Organic ultraviolet-ray absorbent A | 0.03 |
| 11 | Copolyestercarbonate resin D | 10 |
|   | Polycarbonate resin A | 90 |
|   | Organic infrared-ray absorbent A | 0.1 |
|   | Organic ultraviolet-ray absorbent A | 0.03 |

TABLE 4

| Comp. Ex. | Resin Composition | Parts by weight |
|---|---|---|
| 1 | Copolyestercarbonate resin A | 100 |
| 2 | Copolyestercarbonate resin A | 100 |
|   | Organic infrared-ray absorbent A | 0.0006 |
|   | Organic ultraviolet-ray absorbent A | 0.006 |
| 3 | Copolyestercarbonate resin A | 100 |
|   | Organic infrared-ray absorbent A | 0.001 |
|   | Organic ultraviolet-ray absorbent A | 2 |
| 4 | Copolyestercarbonate resin A | 100 |
|   | Organic infrared-ray absorbent A | 3 |
|   | Organic ultraviolet-ray absorbent A | 0.01 |
| 5 | Polycarbonate resin A | 100 |
|   | Organic infrared-ray absorbent A | 2 |
|   | Organic ultraviolet-ray absorbent A | 0.06 |
| 6 | Polycarbonate resin A | 100 |
|   | Organic infrared-ray absorbent A | 2 |
|   | Organic ultraviolet-ray absorbent A | 0.06 |

TABLE 5

| Comp. Ex. | Resin Composition | Parts by weight |
|---|---|---|
| 7 | Copolyestercarbonate resin A | 6 |
|   | Polycarbonate resin A | 94 |
|   | Organic infrared-ray absorbent A | 0.1 |
|   | Organic ultraviolet-ray absorbent A | 0.03 |
| 8 (1) | Polycarbonate resin A | 10 |
|   | Organic infrared-ray absorbent A | 1 |
|   | Organic ultraviolet-ray absorbent D | 1 |
| (2) | Polycarbonate resin A | 90 |

TABLE 6

| Ex. | Transmittance UV (%) | Transmittance IR (%) | Izod impact value (Kg cm/cm) | Appearance |
|---|---|---|---|---|
| 1 | 2.5 | 0.4 | 90 | Good |
| 2 | 4.0 | 24.0 | 90 | Good |
| 3 | 1.9 | 52.4 | 90 | Good |
| 4 | 1.0 | 10.2 | 89 | Good |
| 5 | 0.3 | 0.7 | 89 | Good |
| 6 | 4.2 | 9.8 | 90 | Good |
| 7 | 2.9 | 0.4 | 89 | Good |
| 8 | 2.0 | 9.9 | 89 | Good |
| 9 | 3.4 | 10.3 | 88 | Good |
| 10 | 3.6 | 9.7 | 89 | Good |
| 11 | 3.5 | 10.0 | 90 | Good |

TABLE 7

| Comp. Ex. | Transmittance UV (%) | Transmittance IR (%) | Izod impact value (Kg cm/cm) | Appearance |
|---|---|---|---|---|
| 1 | 44.0 | 91.0 | 90 | Good |
| 2 | 15.0 | 90.1 | 90 | Good |
| 3 | — | — | — | — |
| 4 | — | — | — | — |
| 5 | 3.9 | — | 88 | Bad |
| 6 | 3.7 | — | 87 | Bad |
| 7 | 3.0 | — | 89 | Bad |
| 8 | 0.4 | — | 90 | Bad |

EFFECTS OF THE INVENTION

The ultraviolet- and infrared-ray absorbing polymer composition of the present invention needs neither a high molding temperature beyond about 250° C. nor strict control of the temperature in heat-molding and can be produced easily by means of an ordinary screw extruder or injection molding machine at a high non-defective ratio. Besides, obtained products exhibit stable effects in absorbing ultraviolet rays and infrared rays.

The ultraviolet- and infrared-ray absorbing polymer composition of the present invention allows visible light rays to permeate selectively, and hence it can ensure the brightness of a room, while absorbing ultraviolet rays and infrared rays. In addition, it prevents the deterioration of interior decorations and improves the efficiency of air-conditioning machines such as air conditioners.

The ultraviolet- and infrared-ray absorbing polymer composition of the present invention can be used for automobiles, trains, ships, and domestic use, and at museums, department stores and offices broadly.

What is claimed is:

1. The ultraviolet- and infrared-ray absorbing polymer composition composed of an organic ultraviolet-ray absorbent, an organic infrared-ray absorbent and a polycarbonate resin, said organic infrared-ray absorbent being N,N,N',N'-tetrakis- (P-di--n-butylaminophenyl) -p-phenylenediaminum hexafluoroantimonate, containing 0.01-1 part by weight of an organic ultraviolet-ray absorbent and 0.001-2 parts by weight of an organic infrared-ray absorbent, based on 100 parts by weight of the polycarbonate resin, wherein the polycarbonate resin comprises 10–100% by weight of a copolyestercarbonate, and said composition is manufactured by heat-molding process at 210°–245° from a mixture of the organic infrared-ray absorbent, the organic ultraviolet-ray absorbent, and the polycarbonate resin.

2. The ultraviolet- and infrared-ray absorbing polymer composition composed of an organic ultraviolet-ray absorbent, an organic infrared-ray absorbent and a polycarbonate resin, said organic infrared-ray absorbent being N,N,N',N'-tetrakis-(p-di-n-butylaminophenyl)-p-phenylenediaminum hexafluoroantimonate, containing 0.01-1 part by weight of an organic ultraviolet-ray absorbent and 0.001-2 parts by weight of an organic infrared-ray absorbent, based on 100 parts by weight of the polycarbonate resin, wherein the polycarbonate resin comprises 20–100% per weight of a copolyestercarbonate, and said composition is manufactured by heat-molding process at 210°–245° from a mixture of the organic infrared-ray absorbent, the organic ultraviolet-ray absorbent, and the polycarbonate resin.

3. The ultraviolet- and infrared-ray absorbing polymer composition according to claim 1 or 2, wherein the organic ultraviolet absorbent is selected from the group consisting of benzotriazole compounds, benzophenone compounds, salicylic acid compounds and cyanoacrylate compounds.

4. The ultraviolet- and infrared-ray absorbing polymer composition according to claim 1 or 2, wherein the organic infrared-ray absorbent is N,N,N',N'-tetrakis-(p-di-n-butylaminophenyl)-p-phenylenediaminium hexafluoroantimonate and the organic ultraviolet-ray absorbent is 2-(2'-hydroxy-3'-t-butyl-5'-methylphenyl)-5-chloro-benzotriazole.

* * * * *

UNITED STATES PATENT AND TRADEMARK OFFICE
CERTIFICATE OF CORRECTION

PATENT NO. : 5,604,281
DATED : February 18, 1997
INVENTOR(S) : T. Kamel, et. al.

It is certified that error appears in the above-indentified patent and that said Letters Patent is hereby corrected as shown below:

Column 12, line 26, change "tetrakis- (P-di--n-butylaminophenyl) -p-phenylenediami-" to --tetrakis-(p-di-n-butylaminophenyl)-p-phenylenediaminium--;

at line 27, delete "num"; and at line 39, change "tetrakis-(p-di-n-butylaminophenyl)-p-phenylenediaminum" to --tetrakis-(p-di-n-butylaminophenyl)-p-phenylenediaminium--.

Signed and Sealed this

Sixth Day of May, 1997

*Attest:*

BRUCE LEHMAN

*Attesting Officer*   Commissioner of Patents and Trademarks